(12) United States Patent
Stojkovic et al.

(10) Patent No.: US 9,889,786 B1
(45) Date of Patent: Feb. 13, 2018

(54) PIVOTAL LOADING APPARATUS FOR A TAILGATE

(71) Applicant: FORD GLOBAL TECHNOLOGIES, LLC, Dearborn, MI (US)

(72) Inventors: Dragan B. Stojkovic, Taylor, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/232,576

(22) Filed: Aug. 9, 2016

(51) Int. Cl.
*B60P 1/44* (2006.01)
*B62D 33/023* (2006.01)

(52) U.S. Cl.
CPC .......... *B60P 1/4407* (2013.01); *B60P 1/4471* (2013.01); *B62D 33/023* (2013.01)

(58) Field of Classification Search
CPC ..... B60P 1/4407; B60P 1/4471; B60P 1/4435; B60P 1/43; B60P 1/433; B60P 1/435
USPC ....... 414/498, 486, 487, 462, 468, 472, 480, 414/494, 493, 546, 557
See application file for complete search history.

(56) References Cited

U.S. PATENT DOCUMENTS

| | | | | |
|---|---|---|---|---|
| 538,627 A * | 4/1895 | Shanks | ................. | B60P 1/4407 414/438 |
| 4,325,666 A * | 4/1982 | Chain | ................. | A01D 87/127 414/24.5 |
| 4,787,809 A | 11/1988 | Zrostlik | | |
| 4,813,842 A | 3/1989 | Morton | | |
| 6,435,801 B2 * | 8/2002 | Talbott | .................. | B60P 1/4407 224/521 |
| 6,589,004 B2 * | 7/2003 | Reed | ..................... | B60P 1/4407 414/434 |
| 6,609,481 B1 * | 8/2003 | McCarty | ................ | A01K 15/00 119/512 |
| 6,638,001 B1 * | 10/2003 | McKinley | ............. | B60P 1/4407 224/401 |
| 6,769,858 B1 * | 8/2004 | Butler | ................... | B60P 1/4421 414/462 |
| 6,869,265 B2 * | 3/2005 | Smith | ................... | B60P 1/4407 414/462 |
| 6,893,203 B2 | 5/2005 | Anderson et al. | | |
| 7,111,884 B2 * | 9/2006 | Johnson | .................... | B60P 3/14 296/26.1 |
| 7,293,951 B2 * | 11/2007 | Meeks | .................. | B60P 1/4407 414/462 |
| 2004/0105745 A1 * | 6/2004 | Sandy | ....................... | B60P 3/40 414/557 |
| 2006/0104767 A1 * | 5/2006 | Dugger | .................... | B60R 9/06 414/462 |
| 2007/0196199 A1 * | 8/2007 | Evans | .................. | B60P 1/4407 414/466 |

(Continued)

*Primary Examiner* — Kaitlin Joerger
(74) *Attorney, Agent, or Firm* — Jason Rogers; Brooks Kushman P.C.

(57) ABSTRACT

A tailgate assembly is provided for a pickup truck tailgate. The tailgate assembly includes a tailgate, a bracket, an L-shaped platform, and a retractable link. The L-shaped platform is pivotally attached to the bracket, which is selectively attachable to the tailgate. The L-shaped platform pivots about a pivot point to assist in loading objects into the truck bed by lifting them into the truck bed and rolling/sliding them into the truck bed. The retractable link facilitates the pivoting of the L-shaped platform and is attached to the bracket and a distal end of the L-shaped platform.

14 Claims, 5 Drawing Sheets

(56) References Cited

U.S. PATENT DOCUMENTS

| | | | | |
|---|---|---|---|---|
| 2008/0292435 A1* | 11/2008 | Turner | ................... | B60P 1/4407 |
| | | | | 414/462 |
| 2010/0111658 A1* | 5/2010 | Galliano | ............. | A01M 31/006 |
| | | | | 414/462 |
| 2013/0078065 A1* | 3/2013 | Butler | ................... | B60P 1/4407 |
| | | | | 414/462 |
| 2014/0271068 A1* | 9/2014 | Baumann | .............. | B60P 1/4407 |
| | | | | 414/469 |

* cited by examiner

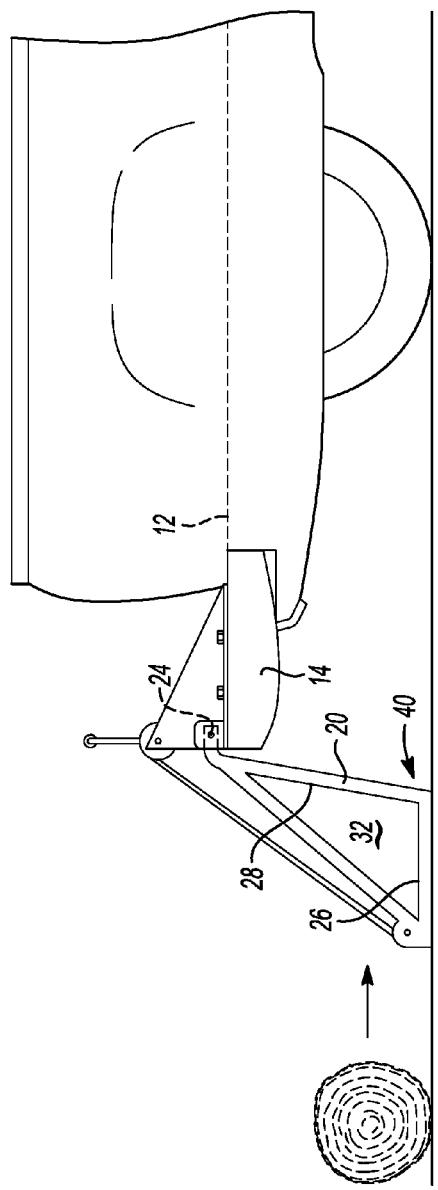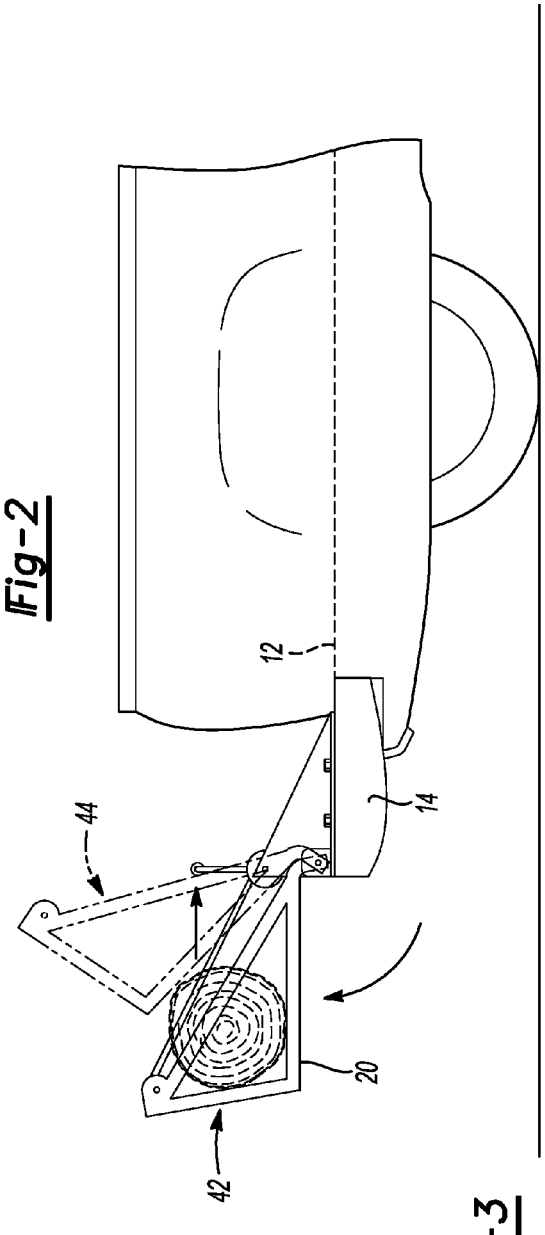

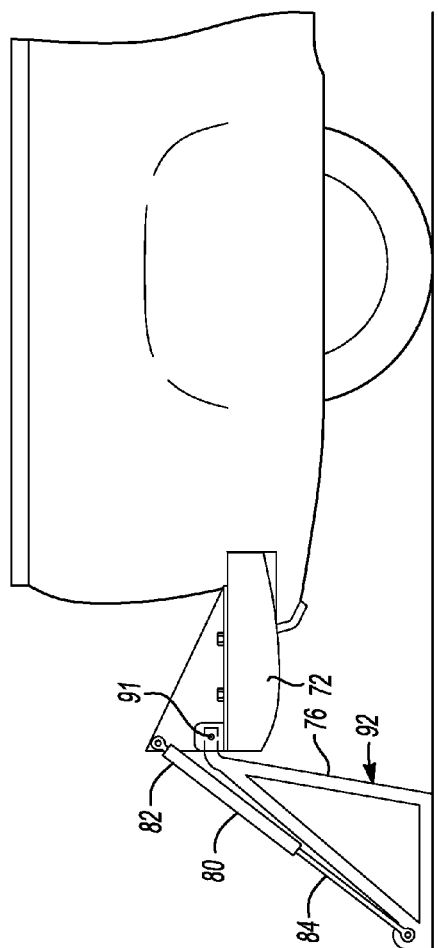
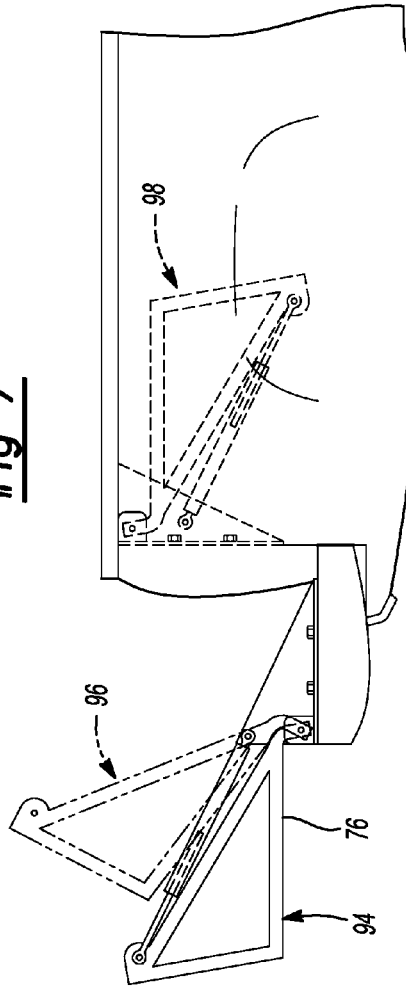

PIVOTAL LOADING APPARATUS FOR A TAILGATE

TECHNICAL FIELD

This disclosure relates to a pick-up truck tailgate that includes a lifting apparatus.

BACKGROUND

Pick-up truck beds are used to transport a wide variety of objects. Objects transported in pick-up truck beds can be heavy or large, such as deer or logs, making them difficult to load. Loading heavy or large objects may require help. However, sometimes help is unavailable, for example, when hunting or working in a remote location alone. Lifting heavy objects alone can be impossible, and may result in injury. When the object is lifted and placed in the truck bed, the object may still need to be pushed further into the truck bed to allow the tailgate to close. Pushing the object into the truck bed may also require help, causing the same problem as discussed above.

The prior art discloses replacing the tailgate of the truck with a lift for assisting in lifting objects with a four bar linkage into to the truck bed. The prior art does not address pushing the object into the truck bed to allow the tailgate to close or to make room for more objects to be loaded. The prior art also includes problems such as removing the tailgate or assembling a ramp and a four bar linkage. Removing the tailgate is time consuming and there is a risk of damaging the tailgate. Assembling a ramp and a four bar linkage can be costly, complicated, and difficult due to the heavy weight of the ramp and linkage. A four bar linkage is also not easily detachable.

This disclosure is directed to solving the above problems and other problems summarized below.

SUMMARY

According to one aspect of this disclosure, a tailgate assembly is provided including a tailgate and a bracket selectively attachable to the tailgate. An L-shaped platform is attached to the bracket by a pivot connector adjacent the top/rear edge of the tailgate. A retractable link is attached to the bracket to pivot the L-shaped platform about the pivot connector.

The L-shaped platform includes a first wall fixed to a second wall at a corner at an angle defining a recess. The L-shaped platform pivots between an extended position with the first wall substantially parallel to the truck bed and the second wall substantially perpendicular to the truck bed, and a retracted position with the first wall substantially perpendicular to the truck bed and the second wall substantially parallel to the truck bed. The L-shaped platform can also pivot further to an inclined position and a stowed position.

The retractable link may include a reel attached to the bracket, and a cable having a first end secured to the reel and a second end attached to a distal end of the L-shaped platform. The reel may include a handle. Alternatively, the retractable link may include a power cylinder having a head portion attached to the bracket and a rod portion attached to a distal end of the L-shaped platform.

According to another aspect of this disclosure, a loading apparatus for a truck bed is provided comprising a bracket selectively attachable to a tailgate. A load receptacle is pivotally attached to the bracket. The load receptacle includes a first platform attached to a second platform at a corner at an angle to define a recess. A reel is attached to the bracket for use with a cable. The cable has a first end secured to the reel and a second end attached to a distal end of the first platform.

The load receptacle may have a substantially L-shaped cross section and may include a support brace connecting a distal end of the first platform to a distal end of the second platform. The load receptacle may be pivotally attached to the bracket above a distal end of the tailgate when the tailgate is open.

The load receptacle is pivotable between an extended position, a retracted position, an inclined position, and a stowed position. When the tailgate is open, in the extended position the first wall is substantially parallel to the truck bed and the second wall is substantially perpendicular to the truck bed. In the retracted position, the first platform is substantially perpendicular to the truck bed and the second platform is substantially parallel to the truck bed. The L-shaped platform is in the inclined position when pivoted to a position between the retracted position and the stowed position. When the tailgate is closed and the L-shaped platform is in the stowed position, the first wall is substantially perpendicular to the truck bed, and the second wall is substantially parallel to the truck bed. The distal end of the first wall may be in contact with the truck bed when the L-shaped platform is in the stowed position.

According to another aspect of this disclosure, a loading apparatus for a truck bed is provided that includes a bracket selectively attached to a tailgate. A load receptacle may be pivotally attached to the bracket. The load receptacle includes a first platform attached to a second platform at a corner at an angle to define a recess. A power cylinder is used to pivot the L-shaped platform between an extended position, a retracted position, an inclined position, and a stowed position. The power cylinder includes a cylinder portion attached to the bracket and a rod portion attached to a distal end of the first platform. The power cylinder may be hydraulic or pneumatic.

The above aspects of this disclosure and other aspects will be described below with reference to the attached drawings.

BRIEF DESCRIPTION OF THE DRAWINGS

FIG. 2 is a side elevation view of the embodiment of FIG. 1 showing the pick-up truck with the tailgate open and the L-shaped platform in the extended position.

FIG. 3 is a side elevation view of the embodiment of FIG. 1 showing the pick-up truck with the tailgate open and the L-shaped platform in a retracted position. The dotted lines represent an inclined position of the L-shaped platform.

FIG. 7 is a side elevation view of the embodiment of FIG. 6 showing the pick-up truck with the tailgate open and the L-shaped platform in the extended position.

FIG. 8 is a side elevation view of the embodiment of FIG. 6 showing the pick-up truck with the tailgate open and the L-shaped platform in a retracted position. The first set of hidden lines represents the L-shaped platform in an inclined position. The second set of hidden lines represents the tailgate being closed and the L-shaped platform in a stowed position.

DETAILED DESCRIPTION

Illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
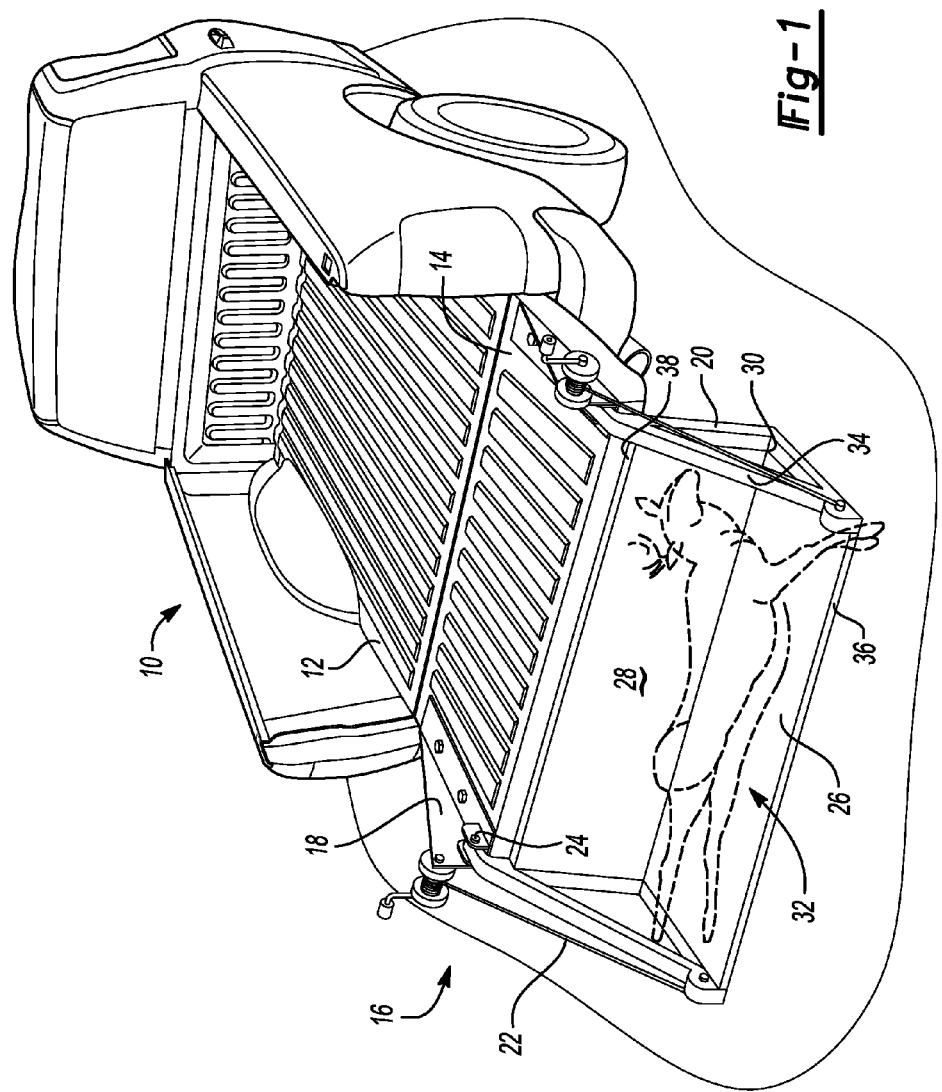
FIG. 1 is a right rear perspective view of a pick-up truck with a tailgate being open, an L-shaped platform in an extended position, and a retractable link, with the retractable link comprising a reel and a cable.

Referring to FIG. 1, a pick-up truck 10 is illustrated that includes a truck bed 12 and a tailgate 14. The tailgate 14 is shown in an open position in FIG. 1. A tailgate assembly 16 includes the tailgate 14, a bracket 18, an L-shaped platform 20, and a retractable link 22. The tailgate assembly 16 is detachably attached to the tailgate 14 at a pivot point 24. The pivot point 24 acts as a fulcrum for lifting the L-shaped platform 20 of the tailgate assembly 16. The tailgate assembly 16 may also be referred to herein as a loading apparatus.

The L-shaped platform 20 includes a first wall 26 and a second wall 28. The L-shaped platform 20 may also be referred to herein as a load receptacle. The first wall 26 and the second wall 28 may also be referred to herein as the first platform and the second platform. The first wall 26 and second wall 28 are attached to each other at a corner 30 at an angle to define a recess 32. The angle as illustrated is perpendicular, but may be substantially perpendicular which is defined as being between 65 degrees and 115 degrees which is an acceptable range of angular relationships. The recess 32, formed by connecting the first wall 26 and the second wall 28, may accommodate a wide variety of objects such as a deer or logs.

The tailgate assembly 16 also includes a support brace 34. The support brace 34 is connected to a distal end 36 of the first wall 26 and a distal end 38 of the second wall 28. The support brace 34 provides structural integrity to reinforce the L-shaped platform 20 when loading heavy objects.

Referring to FIG. 2, the L-shaped platform 20 is shown in an extended position 40 with the tailgate 14 open. The L-shaped platform 20 is configured to pivot about a pivot point 24 between an extended position 40, a retracted position 42, an inclined position 44, and a stowed position 46. When the tailgate 14 is open, the extended position 40 is generally defined by the first wall 26 being substantially parallel to the truck bed 12 and the second wall 28 being substantially perpendicular to the truck bed 12. Substantially parallel is defined as being in a range within +/−20 degrees relative to parallel. Substantially perpendicular is defined as being in a range within +/−20 degrees relative to perpendicular.

Referring to FIG. 3, the L-shaped platform 20 is shown in the retracted position 42 with the tailgate 14 open. When the tailgate 14 is open, the retracted position 42 is generally defined by the first wall 26 being substantially perpendicular to the truck bed 12 and the second wall 28 being substantially parallel to the truck bed 12. The L-shaped platform 20 can be pivoted past the retracted position 42 to the inclined position 44. The inclined position 44 is beneficial for unloading the object from the L-shaped platform 20 by rolling or sliding the object into the truck bed 12.

Figure 4:
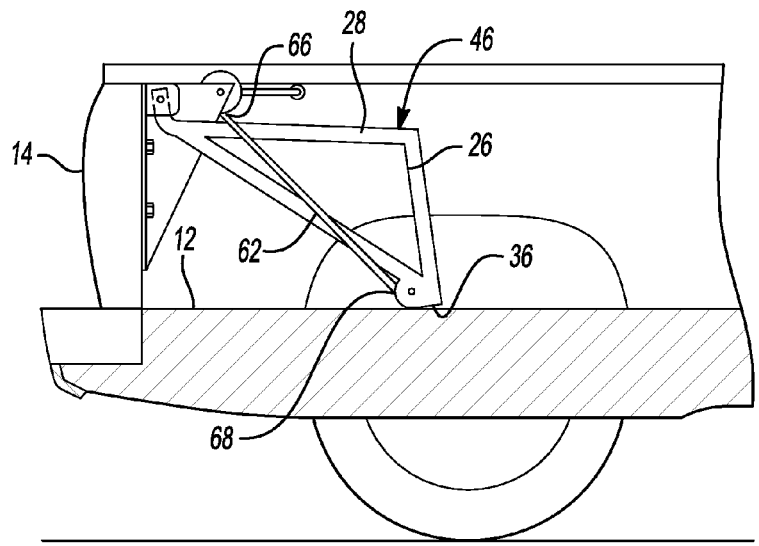
FIG. 4 is a diagrammatic, partial cross-section of the embodiment of FIG. 1 showing the pick-up truck with the tailgate closed and the L-shaped platform in a stowed position.

Referring to FIG. 4, the L-shaped platform 20 is shown in the stowed position 46 with the tailgate 14 closed. In the stowed position 46 the first wall 26 is substantially perpendicular to the truck bed 12, and the second wall 28 is substantially parallel to the truck bed 12. The distal end 36 of the first wall 26 may be in contact with the truck bed 12 when the L-shaped platform 20 is in the stowed position 46.

Figure 5:
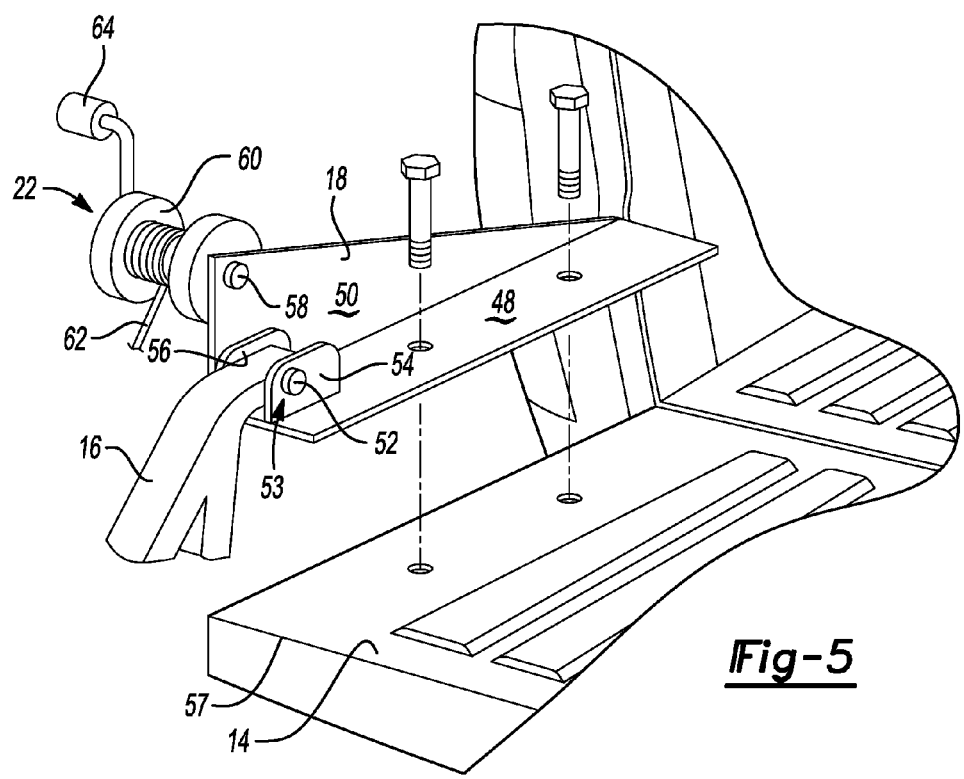
FIG. 5 is an exploded view of a bracket securing a tailgate assembly to a tailgate.

Referring to FIG. 5, the bracket 18 includes a base wall 48 and a side wall 50. The base wall 48 of the bracket 18 is attached to the tailgate 14. In the embodiment shown in FIG. 5, the base wall 48 of the bracket 18 is attached to the tailgate 14 with bolts. However, the bolts could be replaced by a single fastener or a plurality of fasteners. The bracket 18 can be detached from the tailgate 14 by removing the fasteners attaching the base wall 48 of the bracket 18 to the tailgate 14.

The tailgate assembly 16 is attached to the bracket 18 with a pivot connector 53, adjacent a top/rear edge 57 of the tailgate 14. In the embodiment shown in FIG. 5, the pivot connector 53 comprises a pivot pin 52, a first flange 54, and a second flange 56. The first flange 54 and the second flange 56 are spaced apart to receive the tailgate assembly 16. The first flange 54 is attached to the base wall 48 of the bracket 18 and the second flange 56 is attached to the base wall 48 and also may be attached to the side wall 50 of the bracket 18. However, the tailgate assembly 16 could be attached to the bracket 18 with only one flange, a plurality of flanges, or another type of attachment receptacle.

The retractable link 22 is attached to the side wall 50 of the bracket 18. The retractable link 22 may be attached to the side wall 50 with a pin 58 as shown in FIG. 5, or also with a bolt or any other suitable fastener. In the embodiment shown in FIG. 5, the retractable link 22 may include a reel 60 and a cable 62. The cable 62 can be of any suitable type such as wire, rope, or the like. The reel 60 is attached to the side wall 50 of the bracket 18 above the tailgate 14. The reel 60 also may include a handle 64 to facilitate rotating the reel 60. As shown in FIG. 4, the cable 62 has a first end 66 secured to the reel 60 and the second end 68 attached to the distal end 36 of the first wall 26 of the L-shaped platform 20.

Figure 6:
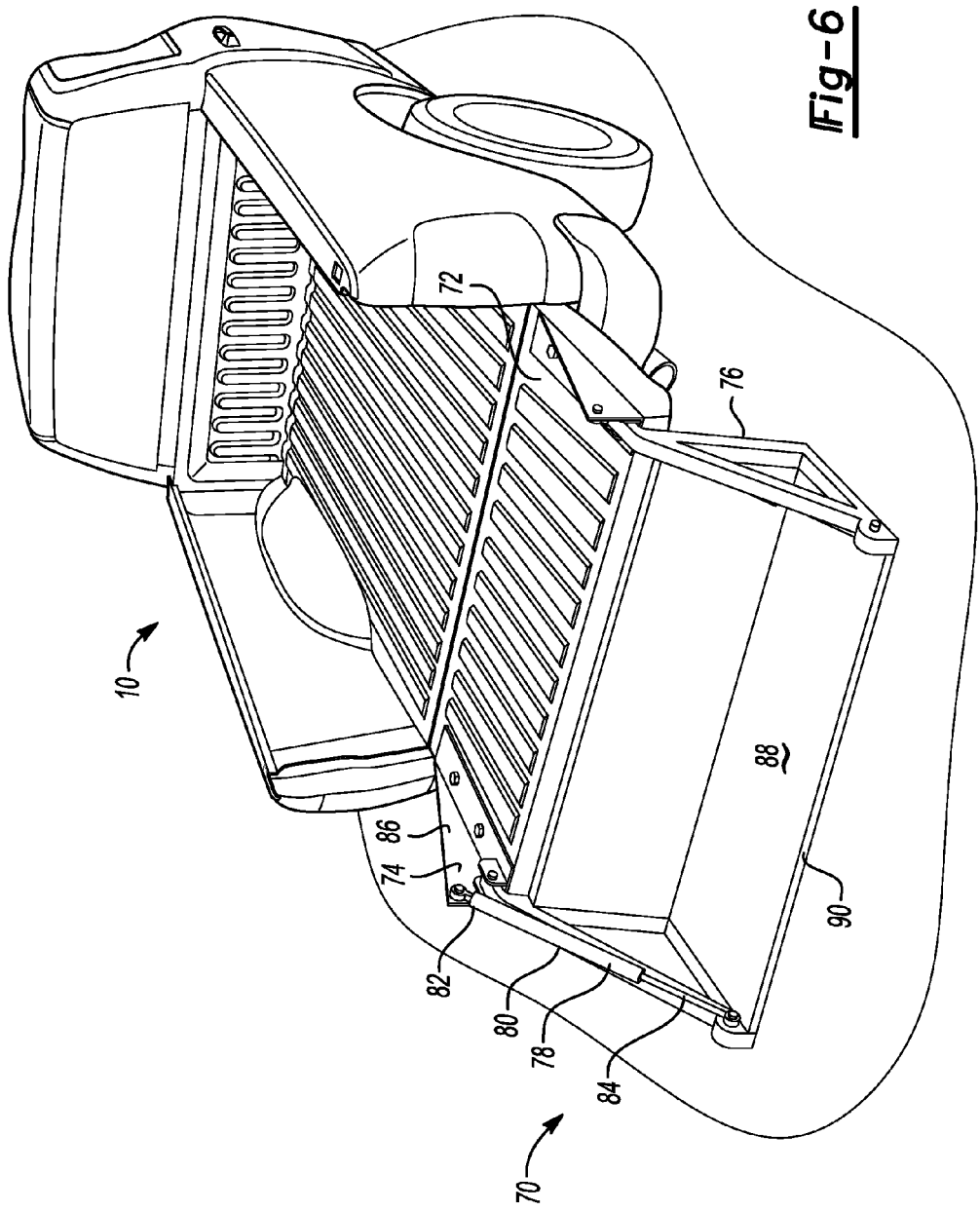
FIG. 6 is a right rear perspective view of a pick-up truck with the tailgate open, an L-shaped platform in an extended position, and a retractable link, with the retractable link comprising a power cylinder.

Referring to FIG. 6, an alternative embodiment of a tailgate assembly 70 is illustrated that includes a tailgate 72, a bracket 74, an L-shaped platform 76, and a retractable link 78. The retractable link 78 includes a power cylinder 80 with a head portion 82, and a shaft portion 84. The head portion 82 may also be referred to herein as the cylinder portion and the shaft portion 84 may also be referred to herein as the rod portion. The power cylinder 80 may be either hydraulic or pneumatic. The head portion 82 of the power cylinder 80 is attached to a side wall 86 of the bracket 74 above the tailgate 72. The shaft portion 84 of the power cylinder 80 is attached to a distal end 90 of a first wall 88 of the L-shaped platform 76.

Referring to FIG. 7, the L-shaped platform 76 is shown in an extended position 92 with the tailgate 72 open. The L-shaped platform 76 is configured to pivot about a pivot point 91 between the extended position 92, a retracted position 94, an inclined position 96, and a stowed position 98 as previously described. When the L-shaped platform 76 pivots from the extended position 92 to the retracted position 94, the shaft portion 84 of the power cylinder 80 withdraws into the head portion 82 of the power cylinder 80. Conversely, when the L-shaped platform 76 pivots from the retracted position 94 to the extended position 92, the shaft portion 84 of the power cylinder 80 extends from the head portion 82 of the power cylinder 80.

Referring to FIG. 8, the L-shaped platform 76 is shown in the retracted position 94. The L-shaped platform 76 is configured to pivot about the pivot point 91 between the extended position 92, the retracted position 94, the inclined position 96, and the stowed position 98 as previously described.

What is claimed is:

1. A loading apparatus for a truck bed, comprising:
   a bracket selectively attachable to a tailgate;
   a load receptacle including a first platform attached to a second platform at an angle defining a recess, wherein the load receptacle is pivotally attached to the bracket;
   a reel attached to the bracket; and
   a cable having a first end secured to the reel and a second end attached to a distal end of the first platform, wherein when the tailgate is open, the load receptacle is pivotable between an extended position with the first platform being substantially parallel to the truck bed and the second platform being substantially perpendicular to the tailgate, and a retracted position with the first platform being substantially perpendicular to the truck bed and the second platform being substantially parallel to the tailgate.

2. The loading apparatus of claim 1, wherein the load receptacle is pivotable to a stowed position inside the truck bed, in the stowed position the first platform being substantially perpendicular to the truck bed and the second platform being substantially parallel to the tailgate.

3. The loading apparatus of claim 1, wherein the load receptacle is pivotable to an inclined position, in the inclined position the load receptacle being between the retracted position and a stowed position.

4. The loading apparatus of claim 1, wherein the load receptacle has a substantially L-shaped cross section.

5. The loading apparatus of claim 1, wherein the load receptacle is pivotally attached to the bracket above a distal end of the tailgate when the tailgate is open.

6. The loading apparatus of claim 1, wherein the loading apparatus includes a support brace connecting a distal end of the first platform to a distal end of the second platform.

7. The loading apparatus of claim 1, wherein the reel includes a handle.

8. A loading apparatus for a truck bed, comprising:
   a bracket selectively attachable to a tailgate;
   a load receptacle including a first platform attached to a second platform at a corner at an angle defining a recess, wherein the load receptacle is pivotally attached to the bracket; and
   a power cylinder including a cylinder portion attached to the bracket and a rod portion attached to a distal end of the first platform, wherein when the tailgate is open, the load receptacle is pivotable between an extended position with the first platform being below and substantially parallel to the truck bed and the second platform hanging below and being substantially perpendicular to the tailgate, and a retracted position with the first platform being substantially parallel to and aligned with the truck bed and the second platform being disposed above and substantially perpendicular to the tailgate.

9. The loading apparatus of claim 8, wherein the load receptacle is pivotable to a stowed position inside the truck bed, in the stowed position the first platform being substantially perpendicular and parallel to the truck bed and the second platform being above and substantially parallel to the tailgate.

10. The loading apparatus of claim 8, wherein the load receptacle is pivotable to an inclined position, in the inclined position the load receptacle being between the retracted position and a stowed position.

11. The loading apparatus of claim 8, wherein the load receptacle has a substantially L-shaped cross section.

12. The loading apparatus of claim 8, wherein the load receptacle is pivotally attached to the bracket above a distal end of the tailgate when the tailgate is open.

13. The loading apparatus of claim 8, wherein the loading apparatus includes a support brace connecting a distal end of the first platform to a distal end of the second platform.

14. The loading apparatus of claim 8, wherein the power cylinder is hydraulic or pneumatic.

\* \* \* \* \*